›
3,069,449
BIMETALLIC CYCLOPENTADIENYL CARBONYL
  COMPOUNDS AND PREPARATION THEREOF
Richard D. Gorsich, Baton Rouge, La., assignor to Ethyl
  Corporation, New York, N.Y., a corporation of Delaware
  No Drawing. Filed July 26, 1961, Ser. No. 126,865
        20 Claims. (Cl. 260—429.7)

This invention relates to, and has as its principal objects, the provision of novel organobimetallic compounds wherein one metal is selected from group IV–A and the other from group VIII of the periodic system, and the provision of novel methods for the preparation of such compounds, the novel compounds being of particular use as antiknock agents in motor fuels and for other purposes.

The compositions of this invention are organobimetallic compounds of the general formula $$[RM^8(CO)_a]_b M^4 R'_{4-b-c} X_c$$

In this formula R is a cyclopentadienyl or alkyl- or acyl-substituted cyclopentadienyl group containing from 5 to about 18 carbon atoms, or is an idenyl or fluoroenyl group; R' is a hydrocarbon group, preferably an alkyl, aryl, cycloalkyl, aralkyl, alkaryl, or alkenyl radical containing from 1 to about 18 carbon atoms; $M^4$ is an element of group IV–A of the periodic system having an atomic number from 32 to 82, inclusive, i.e., germanium, tin or lead; $M^8$ is an element of group VIII of the periodic system having an atomic number from 26 to 78, inclusive, i.e., iron, cobalt, nickel, ruthenium, rhodium, palladium, osmium, iridium, or platinum; X is a halogen; $a$ is 1 when $M^8$ is cobalt, nickel, rhodium, palladium, iridium or platinum, and is 2 when $M^8$ is iron, ruthenium, or osmium; $b$ is an integer from 1 to 3, inclusive; $c$ is an integer from 0 to 3, inclusive; and the sum of $b$ and $c$ is less than 5.

The compositions of this invention are, in general, liquid or solid compounds, the solids melting at low or moderate temperatures. They are stable at ordinary temperatures and can readily be prepared and stored without special precautions for future use. The lead compounds melt, in general, at lower temperatures than the corresponding tin compounds and the melting points tend to increase with the number and molecular weights of the organic substituents designated above as R' as well as with the number and atomic weights of the halogen substituents.

These compounds vary in color from white through yellow to orange. The depth of color tends to increase with the atomic weight of the group IV–A metal, with the number and atomic weight of the halogen atoms and with the number of group VIII metal carbonyl groups in the molecule.

The compounds of this invention in general are soluble in organic solvents such as aliphatic and aromatic hydrocarbons, e.g., n-hexane, petroleum naphtha, and benzene; in alcohols such as ethanol and hexanol; in halohydrocarbons such as methylene dichloride and carbon tetrachloride; in ether such as diethyl ether, methyl ethyl ether, and tetrahydrofuran; and in mixtures of the foregoing.

Of the metals represented by $M^4$ in the above formula, lead is preferred for several reasons. It is readily separated from its ores, is available in large quantity, and is considerably cheaper than the other metals. Consequently, the lead compounds of the invention are more adapted for preparation on a larger scale, thereby taking advantage of the economies normally associated with large-scale operations.

The novel compounds of this invention are of value in the chemical and allied arts. For example, the lead compounds are potent antiknock agents, and in this utility they are versatile agents in that they are highly effective in both unleaded and conventional leaded gasolines made from a wide variety of base stocks. Of the compounds encompassed by this invention, those containing both lead and iron or both lead and nickel are preferred as antidetonants because of the powerful antiknock effects produced thereby. The most outstanding antiknocks are the dialkyllead bis(cyclopentadienyliron dicarbonyls), especially those compounds in which the alkyl groups are methyl or ethyl, or a combination of these.

Thus, gasoline fuel compositions containing the novel compounds of this invention in amounts sufficient to increase the antiknock ratings thereof and, in particular, those containing a dialkyllead bis(cyclopentadienyliron dicarbonyl) are highly effective fuels for internal combustion engines, the use of which is characterized by smoothness of engine operation.

That the compounds of this invention are highly versatile is shown by the fact that their use as antiknock additives not only involves clear—i.e., unleaded—fuels, but includes leaded fuels as well, that is, fuels containing a previously known alkyllead antiknock compound such as tetraethyllead or containing a mixture of such alkyllead compounds. Thus, a liquid hydrocarbon fuel for Otto cycle engines containing antiknock-increasing amounts of both a tetraalkyllead compound and a lead-containing compound of this invention is superior in antiknock effectiveness to the same fuel containing a like amount of either of said compounds in the absence of the other. Best results occur when the concentration of the tetraalkyllead compound is equivalent to from about 0.5 to 6.0 grams of lead per gallon and the concentration of the carbonyl compound is equivalent to from about 0.01 to 4.0 grams of lead per gallon.

The preferred antiknock fuels of the invention (because of their economy and availability) are leaded or unleaded gasolines containing a compound of the formula $$[RFe(CO)_2]_2 M^4 R'_2$$

or a compound of the formula $RFe(CO)_2 M^4 R'_3$ wherein $M^4$ is tin or lead; R is a cyclopentadienyl or lower alkyl- or acyl-substituted cyclopentadienyl group, e.g., methylcyclopentadienyl or acetylcyclopentadienyl, or is an indenyl or fluoroenyl group; and R' is a lower alkyl group, e.g., methyl, ethyl, pentyl, etc., or is an aryl group having up to 8 carbon atoms, e.g., phenyl, tolyl, xylyl, etc.

In addition to their effectiveness as antiknock agents for hydrocarbon fuels, the compounds of this invention are excellent lubricant additives. In this application, as well as in fuels, they exhibit unusual versatility. Thus, when dissolved in lubricants, they effectively improve the lubricating properties thereof, greatly reduce engine wear, virtually eliminate frictional damage, and/or bring about improvements in stability. Their versatility is further attested to by the wide variety of natural and synthetic lubricant bases in which they produce the above effects. For example, they are highly effective for the above and other purposes in such lubricating and industrial oils as crankcase lubricating oils, transformer oils, turbine oils, transmission fluids, cutting oils, glass annealing oils, gear oils, mineral white oils, oils thickened with soaps and inorganic thickening agents, hydraulic fluids and, in general, engine and industrial oils which are derived from crude petroleum or produced synthetically.

Typical of these synthetic lubricants are the polybutene oils, the ester oils, the silicone oils, phosphates, phosphonates, and the like. The ester oils include such compounds as di-2-ethylhexyl sebacate, di-sec-amyl sebacate, di-2-ethylhexyl azelate, di-3-methylbutyl adipate, di-2-ethylhexyl adipate, diisooctyl adipate, di-2-ethylhexyl phthalate, dibutoxyethyl phthalate, pentaerythritol tetracaproate, triethylene glycol di-2-ethylhexanoate, and polyethylene glycol di-2-ethylhexanoate. Examples of the silicone oils are the dimethyl, divinyl, diphenyl, methylvinyl, methylphenyl, diethyl, dibutyl, di-p-bromophenyl, di-p-chlorophenyl, di-p-fluorophenyl, di - m - trifluoromethylphenyl, di-p-phenoxyphenyl, di-m-chlorophenyl, di-3,4-dichlorophenyl, di-3-chloro-4-bromophenyl, di-p-methoxyphenyl, and di-p-cyanophenyl siloxanes, i.e., silicone derivatives.

Among the most effective compounds of this invention as lubricant additives are those containing nickel bonded to lead and, particularly, to tin. Thus, these are the preferred lubricant additives for use in accordance with this invention.

Accordingly, hydrocarbon lubricant compositions containing, in amounts sufficient to improve the lubricating properties thereof, the novel compounds of this invention wherein $M^8$ is nickel and $M^4$ is lead, or tin, and, in particular, those containing a cyclopentadienylnickel dicarbonyl trialkyltin, are effective lubricants for internal combustion engines and for other applications.

An excellent feature of these lubricant additives is that they can be used not only in a wide variety of oils but also in combination with other additives without in any way impairing their effectiveness or that of the other additives. Such other additives include, for example, antioxidants, metal deactivators, detergent-dispersants, pour-point depressants, viscosity index improvers, antifoam agents, corrosion inhibitors, oiliness or film strength agents, dyes, and the like.

The preferred lubricants of the invention are the cheap and readily available liquid hydrocarbon crankcase lubricating oils containing from about 0.05 to about 5.0 weight percent of nickel as a compound of the formula $RNi(CO)M^4R'_3$ wherein $M^4$ is tin or lead, R is a cyclopentadienyl or lower alkyl- or acylcyclopentadienyl group, e.g., methylcyclopentadienyl or acetylcyclopentadienyl, or is an indenyl or fluorenyl group, and R' is a lower alkyl group, e.g., methyl, ethyl, pentyl, etc., or is an aryl group having up to about 8 carbon atoms, e.g., phenyl, tolyl, xylyl, etc.

In addition to the foregoing uses, the compounds of this invention find application as plasticizers and stabilizers for vinyl and other synthetic resins such as polyvinyl chloride.

There are two general methods of preparing the compounds of this invention, namely (1) a metathesis process wherein a cyclopentadienyl group VIII metal carbonyl derivative of an alkali metal is reacted with an alkyl halide derivative of a group IV–A metal, and (2) the hydrohalogenation process wherein a cyclopentadienyl group VIII metal carbonyl derivative of a group IV–A metal alkyl or of an alkyl group IV–A metal halide is reacted with hydrogen halide. Consequently, these two processes constitute embodiments of this invention.

METATHESIS PROCESS

In the metathesis process, the cyclopentadienyl group VIII metal carbonyl alkali metal reactant is represented by the general formula $RM^8(CO)_aM^1_d$, wherein R is a cyclopentadienyl, alkylcyclopentadienyl or acylcyclopentadienyl radical, containing from 5 to about 18 carbon atoms, or is an indenyl or fluorenyl radical; $M^8$ is an element of group VIII of the peroidic system having an atomic number from 26 to 78, inclusive, i.e., iron, cobalt, nickel, ruthenium, rhodium, palladium, osmium, iridium or platinum; $M^1$ is an alkali metal, i.e., lithium, sodium, potassium, rubidium, or cesium; $a$ is 1 when $M^8$ is cobalt, nickel, rhodium, palladium, iridium or platinum, and is 2 when $M^8$ is iron, ruthenium or osmium; and $d$ is 1 when $M^8$ is iron, nickel, ruthenium, palladium, osmium or platinum, and is 2 when $M^8$ is cobalt, rhodium or iridium. In this process, the organometal halide reactant is represented by the general formula $R'_{4-b-c}M^4X_{b+c}$, wherein R' is an alkyl, aryl, cycloalkyl, aralkyl, alkaryl, or alkenyl radical containing up to about 18 carbon atoms; $M^4$ is an element of group IV–A of the periodic system having an atomic number from 32 to 82, inclusive, i.e., germanium, tin or lead; X is a halogen, i.e., fluorine, chlorine, bromine, or iodine; $b$ is 1, 2 or 3; $c$ is 0, 1, 2 or 3; and the sum of $b$ and $c$ does not exceed 4. In this process, one or more of the halogen atoms of the organometal halide reactant are replaced by the cyclopentadienyl group VIII metal mono- or dicarbonyl group of the carbonyl reactant, and the displaced halogen combines with the alkali metal of the carbonyl reactant to form an inorganic salt. In the carbonyl reactant, the preferred alkali metal is sodium or potassium because of the abundance and ready availability of these metals and, of these, sodium is particularly preferred because of its economy. Similarly, the preferred group VIII metals, because of their abundance and availability, are iron, cobalt and nickel, and of these iron is particularly preferred because of its economy. With reference to the organometal halide reactant, the preferred group IV–A metals are tin and lead because of their abundance, availability and economy and, of these, lead is particularly preferred when the product is to be used for antiknock applications, because of the known high antiknock efficacy of this element, and tin is particularly preferred for similar reasons when the final product is to be used in antiwear applications.

The nature of the product obtained in the metathesis process obviously depends upon the nature of the reactant components which unite to form the final product, but also, less obviously, on the number of halogen atoms in the organometal halide reactant and on the relative proportions of the two reactants used. Specifically, if the reactants are combined in such proportions that the alkali metal is equivalent to the halogen present, the product will contain no halogen but will have one cyclopentadienyl group VIII metal carbonyl radical for each halogen atom originally present in the organometal halide. If an excess of the organometal halide reactant is used, the product will contain halogen in an amount proportional to that excess. In the former case, a typical product is cyclopentadienyl iron dicarbonyl triphenyltin, or bis(cyclopentadienyliron dicarbonyl)dimethyltin, in the latter, methylcyclopentadienylcobalt carbonyl ethyltin chloride. Evidently, if the reactants are used in non-stoichiometric proportions, or if the reaction does not reach completion, a mixture of products will be obtained.

The metathesis reaction of this invention is normally carried out in an inert organic solvent such as a hydrocarbon or an ether. Ethers are generally preferred because of their solvent power for the reactants, and tetrahydrofuran is particularly preferred because of the ready solubility of the reactants therein, its volatility and consequent ease of separation from the reaction products, and the ease with which the solvent may be made and kept anhydrous.

The metathesis reaction of this invention proceeds smoothly and rapidly at room temperature or at slightly elevated temperatures, reaching completion for the reaction of lower alkyl derivatives of the group IV–A metal halides with carbonyl reactants containing an unsubstituted cyclopentadienyl radical in 1 to 3 hours at 20 to 60° C. Somewhat longer reaction times are desirable for the higher alkyl and substituted cyclopentadienyl derivatives. The reaction temperature can vary from room temperature or below to the normal reflux temperature of the solvent or even higher if pressure is employed. However, elevated temperatures should be used with care since prolonged heating at reflux may cause some decomposition of the reaction product. The pressure employed may range from 10 millimeters of mercury or less to 100 atmospheres or more but, in general, normal atmospheric pressure is wholly satisfactory and is preferred.

HYDROHALOGENATION PROCESS

In the hydrohalogenation process, as indicated above, reaction occurs between a hydrogen halide and a cyclopentadienyl group VIII metal carbonyl derivative of an organo group IV–A metal halide (obtained by the metathetic reaction discussed above). In this reaction the alkyl groups attached to the group IV–A metal of the carbonyl reactant are replaced wholly or in part by the halogen component of the hydrogen halide reactant. This reaction is normally carried out by combining the reactants in the presence of a halohydrocarbon solvent.

The nature of the product of the hydrohalogenation reaction is closely related to the ratio of the amounts of reactants used. Thus, the use of an excess of the hydrogen halide reactant favors the formation of a product containing halogen but no alkyl groups directly attached to the group IV–A metal, whereas the use of an excess of the carbonyl reactant favors the formation of a product containing both halogen and alkyl groups directly attached to the group IV–A metal. The reaction product is normally a mixture of compounds containing varying proportions of halogen and alkyl groups directly attached to the group IV–A metal, which mixture can readily be separated by solvent extraction, fractionation, or other appropriate means.

The hydrohalogenation reaction of this invention is normally carried out in an inert organic solvent. Halohydrocarbons are generally preferred because of their inertness to and their solvent power for the reactants, and the chloromethanes are particularly preferred because of the ready solubility of the reactants therein, their volatility and consequent ease of separation from the reaction products, and the ease with which the solvent may be made and kept anhydrous.

The hydrohalogenation reaction of this invention proceeds smoothly and rapidly at room temperature or at slightly elevated temperatures, reaching completion with carbonyl reactants containing unsubstituted cyclopentadienyl radicals and alkyl groups of low molecular weight in 10 minutes to a half hour, at 15 to 35° C. Somewhat longer reaction times are desirable for the higher alkyl and substituted cyclopentadienyl derivatives. The reaction temperature can vary from room temperature or below to the normal reflux temperature of the solvent, or even higher if pressure is employed. However, elevated temperatures are normally unnecessary since the reaction proceeds with adequate speed at room temperature and should be used with care since prolonged heating at reflux may cause some decomposition of the reaction product. The pressure employed may range from 10 millimeters of mercury or less to 100 atmospheres or more, but in general, normal atmospheric pressure is wholly satisfactory and is preferred.

PREPARATION OF REACTANTS

The cyclopentadienyl group VIII metal dicarbonyl alkali metal reactants required for the metathesis reaction described above are prepared by treating a cyclopentadienyl group VIII metal mono- or dicarbonyl with an alkali metal. Thus, for example, cyclopentadienyliron dicarbonyl sodium may be obtained as follows:

Cyclopentadienyliron dicarbonyl sodium is prepared by adding 10.6 parts (0.03 mole) of cyclopentadienyliron dicarbonyl dimer to a mixture of about 250 parts of tetrahydrofuran and sodium amalgam (3 parts of sodium and 300 parts of mercury). The mixture is stirred under nitrogen at room temperature for 17 hours after which the mercury is drained off and the resulting brown mixture is used without further treatment for the methathesis reaction.

Modifications in the above procedure to make the other organo group VIII metal carbonyls of alkali metals used in the process of this invention will now be apparent to those skilled in the art.

The invention will be more fully understood by reference to the following set of illustrative examples in which all parts and percentages are by weight.

*Example I*

Cyclopentadienyliron dicarbonyl sodium was prepared by adding 10.6 parts (0.03 mole) of cyclopentadienyliron dicarbonyl dimer to a mixture of about 250 parts of tetrahydrofuran and sodium amalgam (3 parts of sodium and 300 parts of mercury). The brown mixture was stirred under nitrogen as room temperature overnight. Subsequently, the mercury was drained off and to the resulting brown mixture was added 20 parts of triphenyltin chloride. The mixture was stirred at room temperature for 2 hours and then the solvent was evaporated under reduced pressure (water aspirator) at 55° C. The product was extracted from the residue by means of methylene chloride and was then recrystallized from n-hexane to give 10.65 parts of cyclopentadienyliron dicarbonyl triphenyltin, melting at 138 to 140° C. The product, recrystallized from ethanol, melted at 139 to 141° C.

*Example II*

A solution of cyclopentadienyliron dicarbonyl sodium was prepared by adding 9 parts (0.03 mole) of cyclopentadienyliron dicarbonyl dimer in small portions to a mixture of 200 parts of tetrahydrofuran and sodium amalgam (3.5 parts of sodium and 350 parts of mercury). The mixture was stirred at room temperature for 17 hours, after which the mercury was drawn off. To the stirred mixture was added a solution of 7.2 parts (0.03 mole) of dimethyltin dichloride in 30 parts of tetrahydrofuran during a 1-hour period. On completion of the addition, the reddish-brown mixture had become distinctly yellow. The solvent was evaporated in vacuo (water aspirator at 55°). The residue was briefly suspended in water, then filtered and dried at 0.2 millimeter (room temperature). The solid was repeatedly extracted with hot n-hexane and the combined extracts were concentrated until crystals began to settle out. The mixture was allowed to cool to room temperature and was further cooled by an ice bath. The brown crystals formed were filtered off and dried in vacuo to give 10.92 parts of product melting at 105 to 107°. Workup of the filtrate gave an additional 0.75 part of product melting at 98 to 100°. The total yield of bis(cyclopentadienyliron dicarbonyl) dimethyltin was 11.7 parts or 78 percent.

*Analysis.*—Calculated for $C_{16}H_{16}O_4Fe_2Sn$: C, 38.23; H, 3.29. Found: C, 38.50, 38.50; H, 3.33, 3.34

*Example III*

Two parts (0.0038 mole) of cyclopentadienyliron dicarbonyl triphenyltin were dissolved in about 90 parts of methylene dichloride. Anhydrous hydrogen chloride was passed through the solution for 10 minutes at room temperature, after which time the solvent was evaporated. The product, 1.43 parts of cyclopentadienyliron dicarbonyl tin trichloride, was recrystallized from a mixture of methylene dichloride and carbon tetrachloride to give 1.3 parts of reddish-brown needles melting at 150° C. with decomposition.

*Analysis.*—Calculated for $C_7H_5Cl_3O_2FeSn$: C, 20.91; H, 1.25; Sn, 29.5. Found: C, 21.02; H, 1.30; Sn, 30.2.

*Example IV*

When 10.0 parts of cyclopentadienyliron dicarbonyl sodium are reacted with 8.60 parts of diphenyltin dichloride in 930 parts of tetrahydrofuran at 25 to 31° C. for a period of 1½ hours and the resultant orange crystals are recrystallized from ethanol, bis(cyclopentadienyliron dicarbonyl)diphenyltin is obtained.

*Example V*

Cyclopentadienyliron dicarbonyl sodium and dimethyllead dichloride in the proportion of 10.0 parts of the former to 7.7 parts of the latter are dissolved in 890 parts of tetrahydrofuran and are reacted at room temperature for 1 hour. The product, bis(cyclopentadienyliron dicarbonyl)dimethyllead, may be purified by recrystallization from n-hexane.

*Example VI*

Cyclopentadienyliron dicarbonyl lithium (4.60 parts)

and dimethylgermanium difluoride (3.52 parts) are dissolved in 406 parts of benzene. The mixture is stirred for 1 hour at 25 to 32° C. The product obtained is cyclopentadienyliron dicarbonyl dimethylgermanium fluoride.

Example VII

A mixture of 5.30 parts of methylcyclopentadienylcobalt carbonyl disodium and 6.35 parts of ethyltin trichloride is dissolved in 580 parts of toluene and allowed to stand for 2 hours at 24 to 30° C. with occasional stirring. The compound produced is methylcyclopentadienylcobalt carbonyl ethyltin chloride.

Example VIII

Ethylcyclopentadienylnickel carbonyl dimethyllead bromide (12.43 parts) is dissolved in 620 parts of ethylene dibromide and hydrogen bromide is passed into the solution for 20 minutes at 26 to 31° C. The product, ethyl cyclopentadienylnickel carbonyl lead tribromide, is purified by recrystallization from a mixture of methylene dichloride and methylene dibromide.

Example IX

To 22.76 parts of methylethylcyclopentadienylruthenium dicarbonyl potassium, 14.16 parts of octylgermanium triiodide is added and the mixture is dissolved in 850 parts of o-xylene. The mixture is allowed to stand with occasional stirring for 2 hours at 42 to 50° C. Octylgermanium tris(methylethylcyclopentadienylruthenium dicarbonyl) is obtained.

Example X

Dimethylcyclopentadienylrhodium carbonyl dirubidium, dodecyltin trifluoride and petroleum naphtha are combined in the ratio 9.88:8.63:925. The mixture is warmed to 40 to 46° C. for a period of 1½ hours. The product, purified by recrystallization from methylene dichloride, is dimethylcyclopentadienylrhodium carbonyl dodecyltin fluoride.

Example XI

Diethylcyclopentadienylpalladium carbonyl tricyclohexyllead (18.51 parts) is dissolved in carbon tetrachloride (1000 parts) and dry hydrogen chloride is passed into the solution for ½ hour at 23 to 31° C. Diethylcyclopentadienylpalladium carbonyl cyclohexyllead dichloride is obtained in good yield.

Example XII

When 12.51 parts of butylcyclopentadienylosmium dicarbonyl cesium and 13.20 parts of tris(acetylcyclohexyl)germanium bromide are mixed with 1300 parts of benzene and the mixture is reacted for 3 hours at 26 to 32° C., butylcyclopentadienylosmium dicarbonyl tris(acetylcyclohexyl)germanium is obtained.

Example XIII

To 10.29 parts of octylcyclopentadienyliridium carbonyl dilithium, 18.82 parts of dioctadecyltin diiodide are added and the mixture is dissolved in 1460 parts of the diethyl ether of diethylene glycol. The resulting mixture is warmed gently for three hours. The product is octylcyclopentadienyliridium carbonyl dioctadecyltin.

Example XIV 24.48 parts of octadecylcyclopentadienylplatinum carbonyl triphenyllead are dissolved in 1300 parts of methylene dichloride and the mixture is treated with a methylene dichloride solution of 0.50 part of hydrogen fluoride. Reaction for ½ hour at room temperature results in the formation of octadecylcyclopentadienylplatinum carbonyl diphenyllead fluoride.

Example XV 9.21 parts of dodecylcyclopentadienyliron dicarbonyl sodium are reacted with a mixture of 8.14 parts of dibenzylgermanium dichloride and 870 parts of the dibutyl ether of diethylene glycol. The mixture is heated to 43 to 50° C. and maintained in this temperature range for 2 hours. Dodecylcyclopentadienyliron dicarbonyl dibenzylgermanium chloride is obtained.

Example XVI

Tetrahydrofuran solutions of 11.37 parts of cetylcyclopentadienylcobalt carbonyl dipotassium and 8.26 parts of phenethyltin trichloride are mixed and the mixture is dissolved in 980 parts of tetrahydrofuran. The product is cetylcyclopentadienylcobalt carbonyl phenethyltin chloride.

Example XVII

A mixture of 18.65 parts of acetylcyclopentadienylnickel carbonyl o-tolyllead diiodide, 3.20 parts of hydrogen iodide and 1100 parts of ethylene dichloride is stirred at 26 to 31° C. for 50 minutes. Acetylcyclopentadienylnickel carbonyl lead triiodide is obtained.

Example XVIII

A mixture of 42.0 parts of octadecylcyclopentadienylruthenium dicarbonyl rubidium, 5.9 parts of 2,4-xylylgermanium trifluoride and 2400 parts of benzene is heated to 50 to 60° C. for a period of 3½ hours. The product is tris(octadecylcyclopentadienylruthenium dicarbonyl)-2,4-xylylgermanium.

Example XIX 12.8 parts of indenylrhodium carbonyl dicesium are added to a mixture of 7.3 parts of cyclopentadienyltin trichloride with 1000 parts of toluene and the mixture is stirred at 40° C. for 3 hours. The product is indenylrhodium carbonyl cyclopentadienyltin chloride.

Example XX

When 15.3 parts of fluorenylpalladium carbonyl bis(methylcyclopentadienyl)germanium bromide are dissolved in 900 parts of chloroform and hydrogen bromide is passed into the solution for a half hour at room temperature, fluorenylpalladium carbonyl methylcyclopentadienylgermanium dibromide is obtained.

Example XXI

Cyclopentadienylosmium dicarbonyl lithium and trivinylgermanium iodide in the proportion of 8.0 parts of the former to 7.0 parts of the latter are dissolved in 750 parts of o-xylene and are reacted at room temperature for a period of 2 hours. The product is cyclopentadienylosmium dicarbonyl trivinylgermanium.

Example XXII

Methylcyclopentadienyliridium carbonyl disodium (8.6 parts) and diallyltin difluoride (6.0 parts) are dissolved in 730 parts of petroleum naphtha. The mixture is stirred for 1 hour at 39 to 45° C. The product is methylcyclopentadienyliridium carbonyl diallyltin.

Example XXIII 22.0 parts of ethylcyclopentadienylplatinum carbonyl trimesityllead are dissolved in 1200 parts of ethylene dichloride and hydrogen chloride is passed into the solution for a period of a half hour. The product is ethylcyclopentadienylplatinum carbonyl lead trichloride.

Example XXIV

A mixture of 6.5 parts of methylethylcyclopentadienyliron dicarbonyl potassium and 12.2 parts of di-α-naphthylgermanium dibromide is dissolved in 930 parts of diethyl ether and heated under reflux for 2 hours. The product is methylethylcyclopentadienyliron dicarbonyl di-α-naphthylgermanium bromide.

Example XXV

To 8.8 parts of dimethylcyclopentadienylcobalt carbonyl dirubidium, 15.4 parts of indenyltin triiodide are added and the mixture is dissolved in 1200 parts of the diethyl ether of diethylene glycol. The mixture is stirred for 2 hours at 40° C. Dimethylcyclopentadienylcobalt carbonyl indenyltin iodide is obtained in good yield.

*Example XXVI*

Diethylcyclopentadienylnickel carbonyl difluorenyltin fluoride, hydrogen fluoride and 1,1,2-trichloro-1,2,2-trifluoroethane are combined in the ratio 21.3:1:1100. The mixture is reacted at room temperature for a period of 20 minutes. The product is diethylcyclopentadienylnickel carbonyl tin trifluoride.

*Example XXVII*

A base stock is prepared by mixing 24 volumes of isopentane, 66 volumes of isooctane, and 10 volumes of cumene. To this base stock is added 0.75 gram of lead per gallon as a mixture (296.0 parts) containing 5.5 percent of tetramethyllead, 24 percent of trimethylethyllead, 37.5 percent of dimethyldiethyllead, 26 percent of methyltriethyllead and 7 percent of tetraethyllead. To the resulting mixture are added 79.1 parts (0.70 theory) of 1,2-dichloropropane and 145.6 parts (0.775 theory) of ethylene dibromide. Finally, 0.3 gram of lead per gallon as bis(cyclopentadienyliron dicarbonyl)dimethyllead is added. A significant increase in knock rating accompanies the final addition.

*Example XXVIII*

When the base stock of Example XXVII is treated with 1.5 grams of tin per gallon, as bis(cyclopentadienyliron dicarbonyl)diphenyltin, an increase in knock rating is observed.

*Example XXIX*

A tetraethyllead fluid is prepared by mixing 323.5 parts of tetraethyllead with 144.8 parts (0.60 theory) of n-hexyl chloride and 156.2 parts (0.625 theory) of mixed dibromotoluenes. The resulting fluid is mixed with a sufficient amount of a base fuel consisting of 15 percent by volume of alkylate gasoline and 85 percent of catalytically cracked gasoline to give a lead concentration of 1.25 grams of lead per gallon. The addition to this blended fuel of 0.3 gram of tin per gallon as bis(cyclopentadienyliron dicarbonyl)dimethyltin increases the antiknock value thereof.

The following examples serve to illustrate the antiwear utility of the compounds of this invention. All percentages given in these examples are by weight.

*Example XXX*

A Mid-Continent solvent-extracted mineral oil not containing an additive of the invention is run in a four-ball wear machine using ½ inch SAE 52–100 steel balls, at a speed of 570 r.p.m. for 2 hours and under a load of 10 kilograms. Following the test, the balls are disassembled and the average scar diameter on the lower three balls is measured. The test is then repeated with the addition to the mineral oil of 2 percent by weight of cyclopentadienyliron dicarbonyl triphenyltin. The average scar diameter in the second case is less than that in the first.

*Example XXXI*

To the Mid-Continent oil of Example XXX is added 1.5 percent of cyclopentadienylnickel carbonyl triphenyltin. This addition results in a marked diminution in wear as tested by the four-ball wear machine.

As indicated above, a wide variety of organobimetallic compounds falls within the scope of this invention. Further examples of these compounds are the following: cyclopentadienylcobalt carbonyl bis(tribenzylgermanium), bis(methylcyclopentadienylnickel carbonyl) dipropyltin, tris(dimethylcyclopentadienylruthenium dicarbonyl)lead fluoride, indenylrhodium carbonyl dimethyltin, fluorenylpalladium carbonyl ethyllead dichloride, bis(cyclopentadienylosmium dicarbonyl)germanium dibromide, ethylcyclopentadienyliridium carbonyl ethyltin chloride, bis(indenylplatinum carbonyl)diethyllead, tris(fluorenyliron dicarbonyl)butylgermanium, methylcyclopentadienylcobalt carbonyl tin diiodide, bis(diethylcyclopentadienylnickel carbonyl)methyllead bromide, cyclopentadienylruthenium dicarbonyl diphenylgermanium chloride, indenylpalladium carbonyl o-tolyltin difluoride, fluorenylrhodium carbonyl dioctyllead, cyclopentadienyliridium carbonyl dicetyllead and methylcyclopentadienylosmium dicarbonyl methyldipropylgermanium. Of the foregoing compounds, those wherein the group IV–A metal is lead or tin, the group VIII metal is iron or nickel, and the organo radical is cyclopentadienyl or indenyl or a substitution product thereof, are preferred because of their ease of preparation and because of their high effectiveness as antiknock and antiwear agents. Particularly preferred compounds, for the reasons given above, include bis(indenyliron dicarbonyl)diphenyltin, cyclopentadienylnickel carbonyl methyllead dichloride, and methylcyclopentadienylnickel carbonyl trimethyltin.

In making the valuable compounds of this invention, a wide variety of reactants are available. The alkali metal simple or substituted cyclopentadienyliron (or other group VIII metal) carbonyl is made by the reaction of the appropriate cyclopentadienyl group VIII metal carbonyl monomer or dimer with the alkali metal amalgam in tetrahydrofuran or other suitable solvent. The mixture is stirred at room temperature until the reaction is essentially complete. The reaction mixture, after removal of the mercury, is then used without further treatment for the reaction of the invention. Illustrative of these compounds are cyclopentadienyliron dicarbonyl lithium, methylcyclopentadienylcobalt carbonyl disodium, diethylcyclopentadienylnickel carbonyl potassium, indenylpalladium carbonyl rubidium and fluorenylplatinum carbonyl cesium.

Methods for the preparation of organometal halides—the other reactants in the metathetic process of this invention—are described by E. Krause and A. von Grosse in "Die Chemie der Metallorganischen Verbindungen," Borntraeger, Berlin, 1937. Further examples of such compounds include triphenyltin chloride, dimethyltin dichloride, triphenyllead chloride, diethyllead dichloride, dimethyltin difluoride, tris(ethylcyclopentadienyl)germanium iodide, bis(dodecyclopentadienyl)germanium dibromide, bis(ethylphenyl)tin dichloride and bis(acetylcyclohexyl)lead dibromide.

The reactants used in the preparation of the compounds of this invention can be employed in a wide variety of proportions. In the metathesis reaction the proportions can range from a 100 percent or greater excess of the carbonyl reactant to a 100 percent or greater excess of the organometal halide reactant, but the proportions chosen are largely determinative of the nature of the product. Thus, the use of an excess of the carbonyl reactant favors a product containing little or no halogen, whereas the use of an excess of the organometal halide reactant favors a product containing both organo groups and halogen groups attached directly to the group IV–A metal. In the hydrohalogenation reaction the proportions can range from a 100 percent or greater excess of the carbonyl reactant to a 100 percent or greater excess of hydrogen halide; the greater the relative proportion of hydrogen halide, the greater is the proportion of halogen and the smaller the proportion of organo group or groups attached directly to the group IV–A metal in the product. Usually the reactants are employed in proportions corresponding approximately to stoichiometric equivalents but a moderate excess of one reactant or the other is often used to bring about an increased reaction rate.

Among the criteria for the choice of solvents to be employed in the reactions of this invention are that the solvents be liquid under the reaction conditions and that they be inert to both reactants and products. Accordingly, the solvents may include in general aromatic hydrocarbons such as benzene, toluene, the xylenes and the like; aliphatic hydrocarbons such as hexanes, heptanes, octanes, petroleum naphtha and the like; aliphatic or aromatic ethers such as diethyl ether, diethylene glycol diethyl ether, diethylene glycol dibutyl ether or tetrahydrofuran; aliphatic alcohols such as methanol, ethanol, isopropanol, the pentanols, etc., and halohydrocarbons such as methylene chloride and carbon tetrachloride, and the like. The preferred solvent is tetrahydrofuran because of its relatively high solubility for the reactants and for the other reasons mentioned above.

The reactions of this invention may be carried out at any temperature within the normal liquid range of the solvent or at higher temperature if the liquid phase is maintained by the application of pressure. Room temperature is perfectly satisfactory in most instances because of the high reaction rate but temperatures slightly above room temperature may be desirable in certain instances for reactions involving the higher alkyl derivatives. Thus, temperatures in the range of 0 to 150° C. and higher are employable although best results are obtained between 25 and 75° C. and this range is therefore preferred.

Because the reactions usually proceed rapidly under temperatures obtainable at normal pressure, atmospheric pressure is usually satisfactory, but pressures ranging from 10 mm. Hg to 100 atmospheres may be used if desired.

The reactions of this invention may be carried out under any atmosphere inert to both reactants and products. The lead and tin compounds are stable on exposure to dry air, which can thus be used with safety. The use of dry nitrogen is preferred for the less stable germanium compounds and for the preparation of the alkali metal-containing carbonyl reactants. Other suitable protective atmospheres include gaseous saturated hydrocarbons such as methane and ethane and the noble gases helium, neon, argon, krypton and xenon.

The normally solid compounds of this invention are soluble in and can be purified by recrystallization from a variety of organic solvents. Specifically, simple aromatic solvents such as benzene or toluene, simple aliphatic solvents such as hexane, alcohols such as ethanol and halohydrocarbons such as methylene chloride, and their mixtures, are found to be satisfactory.

In the improved fuels of this invention, organic halide scavengers can be employed. These scavengers can be either aliphatic or aromatic halohydrocarbons or a combination of the two having halogen attached to carbon in either the aliphatic or aromatic portion of the molecule. These scavengers may also be carbon-, hydrogen-, and oxygen-containing compounds such as haloalkyl ethers, halohydrins, halonitro compounds, and the like. Still other examples of scavengers that may be used in this invention are illustrated in U.S. Patents 1,592,954; 1,668,022; 2,398,281; 2,479,900; 2,479,901; 2,479,902; 2,479,903; 2,496,983; 2,661,379; 2,822,252; 2,849,302; 2,849,303 and 2,849,304. Mixtures of different scavengers may also be used. Concentrations of organic halide scavengers ranging from about 0.2 to about 2.5 theories based on the lead are usually sufficient although greater or lesser amounts may be used. Thus, in general, use is made of an amount of organic halide scavenger that is capable of reacting with the lead during engine combustion to form relatively volatile lead halide and thereby effectively to control the amount of deposit formed in the engine.

The fuels of this invention can contain other additives. Typical of these are antioxidants (e.g., N,N'-di-sec-butyl p-phenylenediamine; p-N-butylamino phenol; 4-methyl-2,6-di-tert-butyl phenol; etc.), metal deactivators (e.g., N,N'-disalicylidene-1,2-diaminopropane, etc.), dyes, phosphorus additives (e.g., tris($\beta$-chloropropyl)thionophosphate, dimethyltolyl phosphate, dimethylxylyl phosphate, dicresyl phosphate, cresyldiphenyl phosphate, trimethyl phenyldimethyl phosphate, tricresyl phosphate, phenyl phosphate, etc.), boron additives, corrosion inhibitors, detergents, antiicing additives, other antiknock agents (e.g., methylcyclopentadienylmanganese tricarbonyl, cyclopentadienylmanganese tricarbonyl, cyclopentadienylnickel nitrosyl, manganese pentacarbonyl, iron carbonyl, dicyclopentadienyliron), induction system cleanliness additives, top cylinder lubricants and the like.

Having thus described the process and novel products of this invention it is not intended that it be limited except as set forth in the following claims.

I claim:

1. A compound represented by the general formula $[RM^8(CO)_a]_bM^4R'_{4-b-c}X_c$, wherein R is a radical selected from the group consisting of cylopentadienyl, alkylcyclopentadienyl and acylcyclopentadienyl radicals containing from 5 to about 18 carbon atoms and of indenyl and fluorenyl radicals; R' is a radical selected from the group consisting of alkyl, aryl, cycloalkyl, aralkyl, alkaryl, and alkenyl radicals containing from 1 to about 18 carbon atoms; $M^4$ is an element of group IV–A of the periodic system having an atomic number from 32 to 82, inclusive; $M^8$ is an element of group VIII of the periodic system having an atomic number from 26 to 78, inclusive; X is a halogen; $a$ is 1 when $M^8$ is an element selected from the group consisting of cobalt, nickel, rhodium, palladium, iridium and platinum and is 2 when $M^8$ is an element selected from the group consisting of iron, ruthenium and osmium; $b$ is an integer from 1 to 3, inclusive; $c$ is an integer from 0 to 3, inclusive; and the sum of $b$ and $c$ is less than 5.

2. The compound of claim 1 wherein $M^4$ is tin.

3. The compound of claim 1 wherein $M^4$ is tin and $M^8$ is iron.

4. Cyclopentadienyliron dicarbonyl triphenyltin.

5. Bis(cyclopentadienyliron dicarbonyl)dimethyltin.

6. Bis(cyclopentadienyliron dicarbonyl)diphenyltin.

7. Cyclopentadienyliron dicarbonyl tin trichloride.

8. The method of preparing a compound represented by the general formula $[RM^8(CO)_a]_bM^4R'_{4-b-c}X_c$, wherein R is a radical selected from the group consisting of cyclopentadienyl, alkylcyclopentadienyl, and acylcyclopentadienyl radicals containing from 5 to about 18 carbon atoms, and of indenyl and fluorenyl radicals; R' is a radical selected from the group consisting of alkyl, aryl, cycloalkyl, aralkyl, alkaryl, and alkenyl radicals containing from 1 to about 18 carbon atoms; $M^4$ is an element of group IV–A of the periodic system having an atomic number from 32 to 82, inclusive; $M^8$ is an element of group VIII of the periodic system having an atomic number from 26 to 78, inclusive; X is a halogen; $a$ is 1 when $M^8$ is an element selected from the group consisting of cobalt, nickel, rhodium, palladium, iridium and platinum, and is 2 when $M^8$ is an element selected from the group consisting of iron, ruthenium and osmium; $b$ is an integer from 1 to 3, inclusive; $c$ is an integer from 9 to 3, inclusive; and the sum of $b$ and $c$ is less than 5, which comprises reacting a compound represented by the general formula $RM^8(CO)_aM^1_d$, wherein $M^1$ is an element of group I–A of the periodic system having an atomic number from 3 to 55, inclusive; $a$ is 1 when $M^8$ is an element selected from the group consisting of cobalt, nickel, rhodium, palladium, iridium and platinum, and is 2 when $M^8$ is an element selected from the group consisting of iron, ruthenium and osmium; and $d$ is 1 when $M^8$ is an element selected from the group consisting of iron, nickel, ruthenium, palladium, osmium and platinum and is 2 when $M^8$ is selected from the group consisting of cobalt, rhodium and iridium, with a compound represented by the general formula $$R'_{4-b-c}M^4X_{b+c}$$

wherein $b$, $c$, R, R', $M^1$, $M^4$, $M^8$ and X have the meanings defined hereinbefore.

9. The method of claim 8 wherein $M^1$ is sodium and X is chlorine.

10. The method of preparing cyclopentadienyliron dicarbonyl triphenyltin which comprises reacting cyclopentadienyliron dicarbonyl sodium with triphenyltin chloride.

11. The method of preparing bis(cyclopentadienyliron dicarbonyl)dimethyltin which comprises reacting cyclopentadienyliron dicarbonyl sodium with dimethyltin dichloride.

12. The method of claim 8 wherein $M^4$ is tin and $M^8$ is iron.

13. The method of claim 8 wherein the reaction is carried out in an inert organic solvent.

14. The method of claim 8 wherein the reaction is carried out in tetrahydrofuran as solvent.

15. The method of preparing a compound represented by the general formula $[RM^8(CO)_a]_bM^4R'_{4-b-c-e}X_{c+e}$, wherein R is a radical selected from the group consisting of cyclopentadienyl, alkylcyclopentadienyl and acylcyclopentadienyl radicals containing from 5 to about 18 carbon atoms, and of indenyl and fluorenyl radicals; R' is a radical selected from the group consisting of alkyl, aryl, cycloalkyl, aralkyl, alkaryl, and alkenyl radicals containing from 1 to about 18 carbon atoms; $M^4$ is an element of group IV–A of the periodic system having an atomic number from 32 to 82, inclusive; $M^8$ is an element of group VIII of the periodic system having an atomic number from 26 to 78, inclusive; X is a halogen; $a$ is 1 when $M^8$ is an element selected from the group consisting of cobalt, nickel, rhodium, palladium, iridium and platinum, and is 2 when $M^8$ is an element selected from the group consisting of iron, ruthenium and osmium; $b$ is an integer from 1 to 3, inclusive; $c$ is an integer from 0 to 2, inclusive; $e$ is an integer from 1 to 3, inclusive; and the sum of $b$, $c$ and $e$ is less than 5, which comprises reacting a compound represented by the general formula $[RM^8(CO)_a]_bM^4R'_{4-b-c}X_c$, wherein $a$, $b$ and $c$ have the meanings defined hereinbefore, with a hydrogen halide.

16. The method of claim 15 wherein X is chlorine.

17. The method of claim 15 wherein $M^4$ is tin and $M^8$ is iron.

18. The method of preparing cyclopentadienyliron dicarbonyl tin trichloride which comprises reacting cyclopentadienyliron dicarbonyl triphenyltin with hydrogen chloride.

19. The method of claim 15 wherein the reaction is carried out in an inert organic solvent.

20. The method of claim 15 wherein the reaction is carried out in methylene chloride as solvent.

References Cited in the file of this patent

UNITED STATES PATENTS

| | | |
|---|---|---|
| 3,007,953 | Closson et al. | Nov. 7, 1961 |
| 3,015,668 | Kozilowski | Jan. 2, 1962 |

FOREIGN PATENTS

| | | |
|---|---|---|
| 793,355 | Great Britain | Apr. 16, 1958 |

OTHER REFERENCES

King et al.: "Chem. and Industry," pp. 747–748 (June 3, 1961).

UNITED STATES PATENT OFFICE
CERTIFICATE OF CORRECTION

Patent No. 3,069,449            December 18, 1962

Richard D. Gorsich

It is hereby certified that error appears in the above numbered patent requiring correction and that the said Letters Patent should read as corrected below.

Column 3, line 61, for "peroidic" read -- periodic --; column 4, lines 74 and 75, for "cryclopentadienyl" read -- cyclopentadienyl --; column 5, lines 64 and 65, for "methathesis" read -- metathesis --; column 6, line 5, for "as" read -- at --; column 10, line 43, for "(dodecyclopentadienyl)" read -- (dodecylcyclopentadienyl) --; column 11, line 74, strike out "dicresyl phosphate, cresyldiphenyl phosphate, trimethyl", and insert same after "phenyl-" in line 75, same column 11.

Signed and sealed this 17th day of September 1963.

(SEAL)
Attest:

ERNEST W. SWIDER
Attesting Officer

DAVID L. LADD
Commissioner of Patents